United States Patent [19]

Legueu

[11] Patent Number: 4,862,987
[45] Date of Patent: Sep. 5, 1989

[54] ALL-WHEEL-DRIVE OFF-HIGHWAY VEHICLE

[76] Inventor: Paul Legueu, 85, avenue de Mazy, 44380 Pornichet, France

[21] Appl. No.: 273,180

[22] Filed: Nov. 15, 1988

Related U.S. Application Data

[63] Continuation of Ser. No. 82,001, Aug. 5, 1987, abandoned.

[30] Foreign Application Priority Data

Aug. 8, 1986 [FR] France ................................. 86 11509

[51] Int. Cl.$^4$ ...................... B62D 21/02; B62D 63/00; B60K 17/34
[52] U.S. Cl. ..................................... 180/233; 180/22; 280/688; 280/694
[58] Field of Search ................ 180/22, 6.48, 233, 234, 180/236, 242, 307, 240; 280/97, 98, 688, 689, 690, 699

[56] References Cited

U.S. PATENT DOCUMENTS

| | | | |
|---|---|---|---|
| 3,191,708 | 6/1965 | Simonds et al. | 180/44 |
| 4,022,290 | 5/1977 | Boyer | 180/22 |
| 4,417,634 | 11/1983 | Quaeck | 180/22 |
| 4,470,475 | 9/1984 | Carlson | 180/22 |
| 4,484,765 | 11/1984 | Appelblatt et al. | 180/233 |
| 4,614,249 | 9/1986 | Yamanaka | 180/233 |
| 4,650,029 | 3/1987 | Foote et al. | 180/233 |
| 4,664,208 | 5/1987 | Horiuchi et al. | 180/233 |
| 4,666,015 | 5/1987 | Matsuda et al. | 180/233 |
| 4,669,559 | 6/1987 | Fukui | 180/233 |

Primary Examiner—Richard A. Bertsch
Attorney, Agent, or Firm—Fidelman & Wolffe

[57] ABSTRACT

An all-wheel-drive off-highway heavy truck comprising a cab (1) and a platform (2) mounted on a chassis which is rigid about the vertical axis. This chassis is mounted on front and rear axle sets (4, 5), each comprising front and rear axles and four wheels (41, 43, 51, 53). The wheels of the front axle set (4) are steered and the front axles include constant velocity joints, the axles of the front set being otherwise similar to the axles of the rear set. The suspensions of the axle sets (4, 5) include leaf spring stacks connected between the front and rear axles of the relevant set at each side, and clamped in a central portion to a pivot axis (83) about which the axles can pivot. Reaction rods connect the axles with the pivot axis. Hydraulic telescopic shock absorbers are connected between the axles of the front set and the chassis. The pivot axes are mounted equi-distant between the front and rear axles of the relevant set and the spacing of the axles of the front set is equal to the spacing of the axles of the rear set.

10 Claims, 6 Drawing Sheets

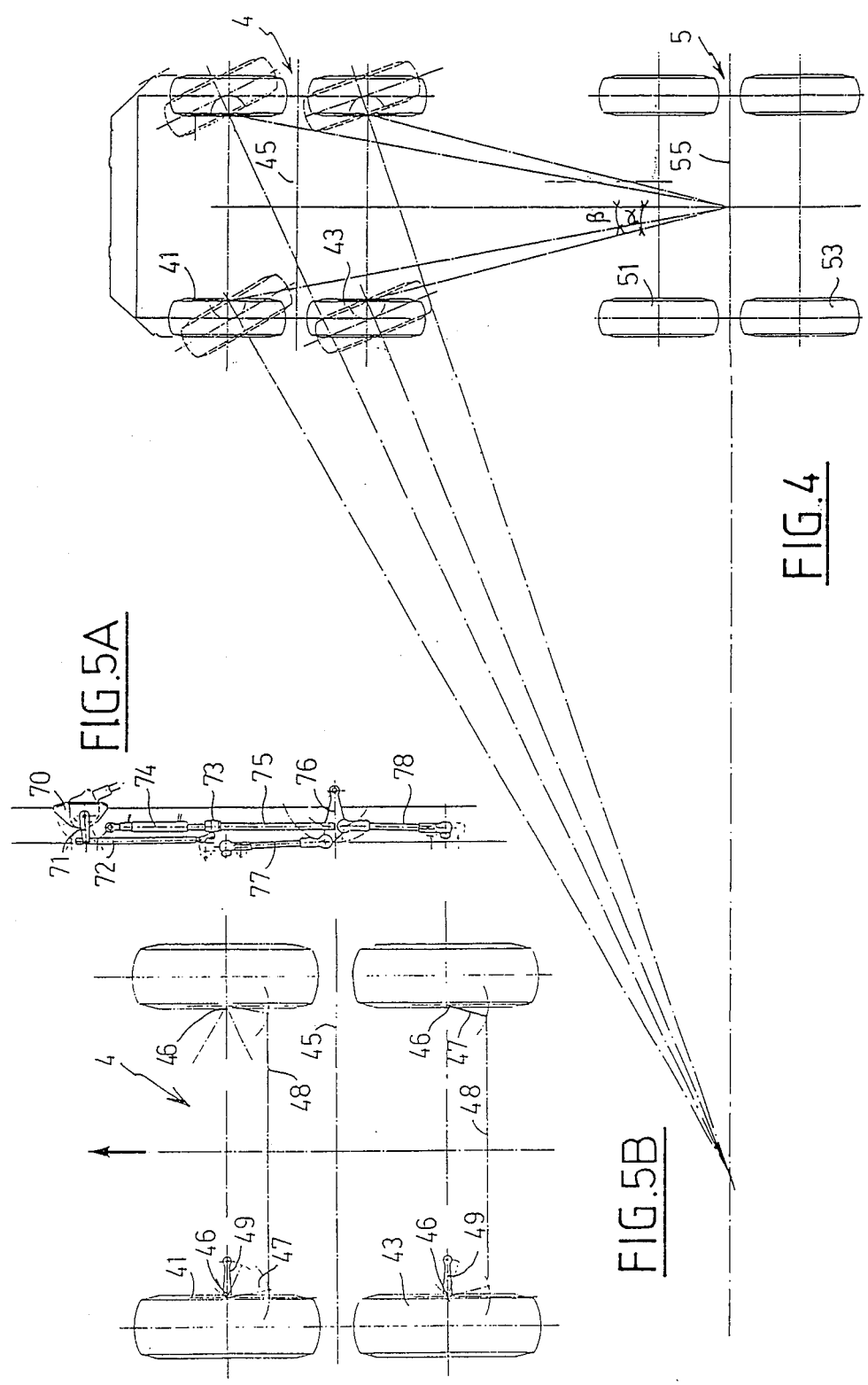

ALL-WHEEL-DRIVE OFF-HIGHWAY VEHICLE

This application is a continuation of U.S. application Ser. No. 82,001, filed Aug. 5, 1987, now abandoned.

BACKGROUND OF THE INVENTION

This invention relates to a wheeled automobile vehicle, of the off-highway kind with integral transmission, that is to say that all the wheels may be driven, and particularly to a heavy vehicle, suitable for civilian and military applications.

DESCRIPTION OF THE PRIOR ART

Vehicles of this kind are available but, in general, they are relatively light (weight less than about ten tonnes) and therefore usually only have two or three axles, that is to say four or six wheels. An increase in weight necessitates an extra axle and heavier vehicle are naturally lead to be articulated trucks (tractor and semi-trailer), not all of whose wheels are driven. However, this solution is not always the best because of the particular driving conditions of this type of vehicle and since the fourth axle may be required by the laden weight of the vehicle and the increased dimensions which off-highway use necessitates but is not necessarily justified by the design length of the vehicle, which should be as small as possible for ready use off-highway, and to enable the vehicle to take bends in the roads easily, without the short length being compensated by an increased height, so as to keep a low center of gravity, and also so that the vehicle is not necessarily classed as an outside vehicle (long vehicule, in particular).

OBJECTS OF THE INVENTION

An object of the invention is to provide a heavy off-highway wheeled automobile vehicle which can have a laden vehicle weight exceeding about ten tonnes, the choice of a wheeled vehicle rather than a tracked vehicle being due to the necessity for a mixed utilisation of the vehicle, which may be required to drive on the ordinary road infrastructure.

Other objects of the invention are to provide a vehicle of this kind which is manoeuvrable and therefore compact, which is robust and very reliable, and which avoids high manufacturing, usage, maintenance and repair costs.

A particular object of the invention is to provide a vehicle of the above kind having a high degree of standardisation of its components.

BRIEF DESCRIPTION OF THE INVENTION

The present invention provides an automobile vehicle comprising a driving cab and a low-bearing platform, a chassis which is rigid about a vertical axis on which said cab and platform are mounted, said chassis comprising first and second longitudinal girders disposed side by side, said chassis being supported on front and rear axle sets, each of said axle sets comprising respective front and rear drive axles, a transverse pivot axis on said chassis, and suspension means connecting said front and rear axles with the corresponding pivot axis respectively, each said axle comprising at least two driven wheels on opposite sides of the axle, each said front axle being substantially similar to the rear axle of the same set and said front and rear axles of said front axle set being steerable and comprising constant velocity joints and steering linkage means but being otherwise substantially similar to said axles of said rear set and being spaced apart by a similar distance to the spacing of said axles of said rear set, each said pivot axis being disposed substantially equi-distant between said front and rear axle of the corresponding set, whereby said axles may pivot about the corresponding pivot axis.

DESCRIPTION OF THE DRAWINGS

Other features and advantages of the invention will appear from the following description of an embodiment thereof, given by way of example with reference to the accompanying drawings, in which:

FIG. 4 is a diagrammatic plan view of the vehicle showing the steering geometry of the wheels;

FIGS. 5A and 5B are respectively side and plan partial views showing the correspondance of the main parts of the steering mechanism and the way in which they cooperate with the wheels;

Figure 3:
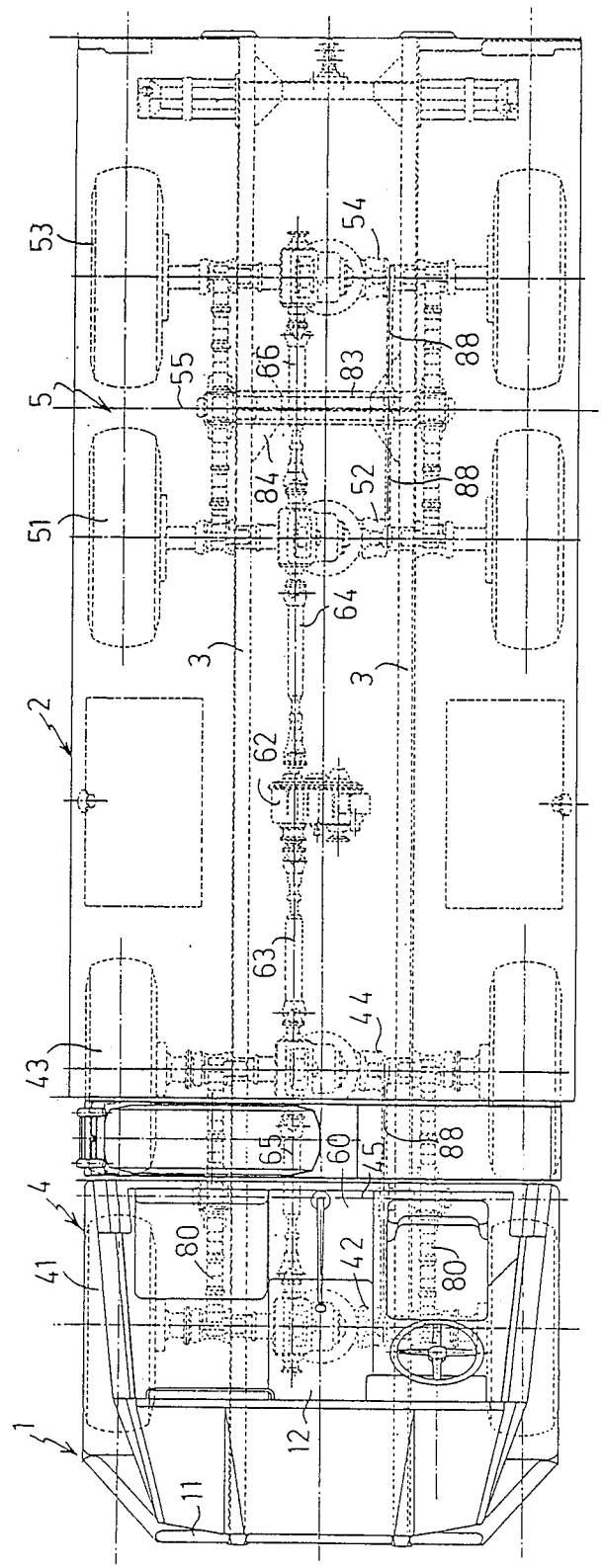
FIG. 3 is a plan view of the vehicle.

The automobile vehicle shown in the drawings is a lorry (truck) having 8 driven wheels of which 4 are steered, of the kind having a platform that is to said it comprises a cab 1 and a platform 2. The vehicle is a rigid vehicle, that is to say a vehicle without any articulation of one part relative to another about a vertical axis, as would be the case for articulated trucks comprising tractor and semi-trailor. The cab 1 and platform 2 are carried on two longitudinal chassis girders 3 supported at the front and rear of the vehicle by two axle sets 4, 5 of driven wheels respectively each set comprising (at least) two front driven wheels 41, 51 on either side of a front axle 42, 52 and (at least) two rear driven wheels 43, 53 on either side of a rear axle 44, 54 substantially identical to the front axle of the same set; the driven wheels 41, 43 of the front axle set 4 are also steered and the axles 42, 44 of the front set 4 are spaced apart by the same distance as the axles 52, 54 of the rear set and are similar to the axles of the rear set except that they also have constant velocity ("C.V.") joints; the wheels of both the axles sets 4, 5 are mounted for movement pivotingly about an axis 45, 55 of a respective pivot extending transversely of the vehicle and disposed substantially semi-distant between the front and the rear wheels of the corresponding set (shown over its whole length only for the rear set in FIG. 3, to avoid overloading the drawing).

In order to enable the truck to drive over terrain presenting big changes in slope, the tangent to the front wheels 41 of the vehicle through the bottom of the front fender 11 rises at angle to the wheel base plane at an angle of 46°, obtained by the fact that the engine 12 is mounted in a rearwards position projecting only slightly in front of the frontmost angle 42°; on the other hand, so that the payload may be distributed on both of the four-wheel axle sets, the cab 1 is mounted forwards above the engine, with the rear of the engine partly above the two seats of the cab, so that the cab doors are disposed above the frontmost wheels 41; to a similar end, the tangent to the rearmost wheels of the vehicle passing through the base of the rear of the vehicle makes an angle with the wheel-base plane of 36°.

The overall dimensions in this example are 7.20 m (length), 2.25 m (width) and 2.60 m (height), the empty weight (kerb-side) is 7000 kg distributed 3.5 tonnes on each axle set approximately half-way between the two front axles, that is 1.70 m from the front of the vehicle, and half-way between the two rear axles, that is 1.75 m from the rear (equivalent to a wheel-base of 3.75 m), the center of gravity being approximately 1.85 m from the axis of the front set and 1.90 m from the rear set; under load (with 7000 kg of payload), the center of gravity will normally pass 2.35 m from the front set and 1.4 m from the rear set as defined above, with 5200 kg on the front set and 8800 kg on the rear set.

The payload is disposed on the chassis which is a low chassis at 1.20 m from the ground, and the length available for the payload is 500 m, due to the forward mounting of the cab on the engine; a clearance of 0.40 m is even provided between the cab rear wall and the position of the payload, for storage of various accessories, such as a spare speel, a ladder for access to the platform, for example.

As mentioned above, the vehicle has eight wheels presenting a symmetrical structure at front and rear with a track of 1.90 m in this example and a spacing between the front and rear axles of the same set of 1.20 m, and four of the wheels are steered, that is to say the four wheels 41, 43 of the front set 4.

The driveability of the vehicule off-highway and on-highway in bends, is due mainly to its low-radius turning circle (10.75 m overall) obtained by the design of the geometry and dimensions of the front and rear axle sets. The spacing of the pivot axes 46 (FIG. 5B) of the front wheels (disposed substantially in line with the inner wall of the corresponding types) is 1.60 m and the spacing of the rear wheels is substantially identical; the angle defined between the longitudinal axis of the vehicule and the lines joining the intersection of this longitudinal axis with the transverse axis of the rear set disposed equi-distant from its front and rear axles with the pivot of each rear wheel 43 of the front set is 14°21′, while the angle defined between the longitudinal axis and the lines joining the intersection of the longitudinal and rear transverse axes to the pivot of each front wheel 41 of the front set is 10°27′. Also, regarding the front wheels 41 of the front set, during steering the inner wheel makes a maximum steering angle of 30° whereas the outer wheel makes a maximum steering angle of 25°28′, while in the case of the rear wheels of the front set, the maximum steering angles are respectively 22°34′ and 18°56′. The angles between the vehicle's longitudinal axis and the lines joining the wheel pivots to the hinge between the steering arm 47 and the connecting rod 48 for the levers of the wheels of the same axle (shown schematically in FIG. 5B) is 10°27′ for the front wheels of the front set and 14°21′ for the rear wheels of the front set and are therefore equal to the angles between the vehicle's longitudinal axis and the lines joining the pivot of the relevant wheel to the intersection of the longitudinal axis and the transverse axis as described above.

These values are not the only possible value but are chosen so that, during steering, the respective vertical projections (onto a horizontal plane) of the extensions of the central axes of rotation of each steered wheel intersect in the same point situated on the vertical projection onto a horizontal plane of the extension of the pivot axis 55 of the rear axle set disposed equi-distant between the front and rear axles of this rear set.

Figure 1:
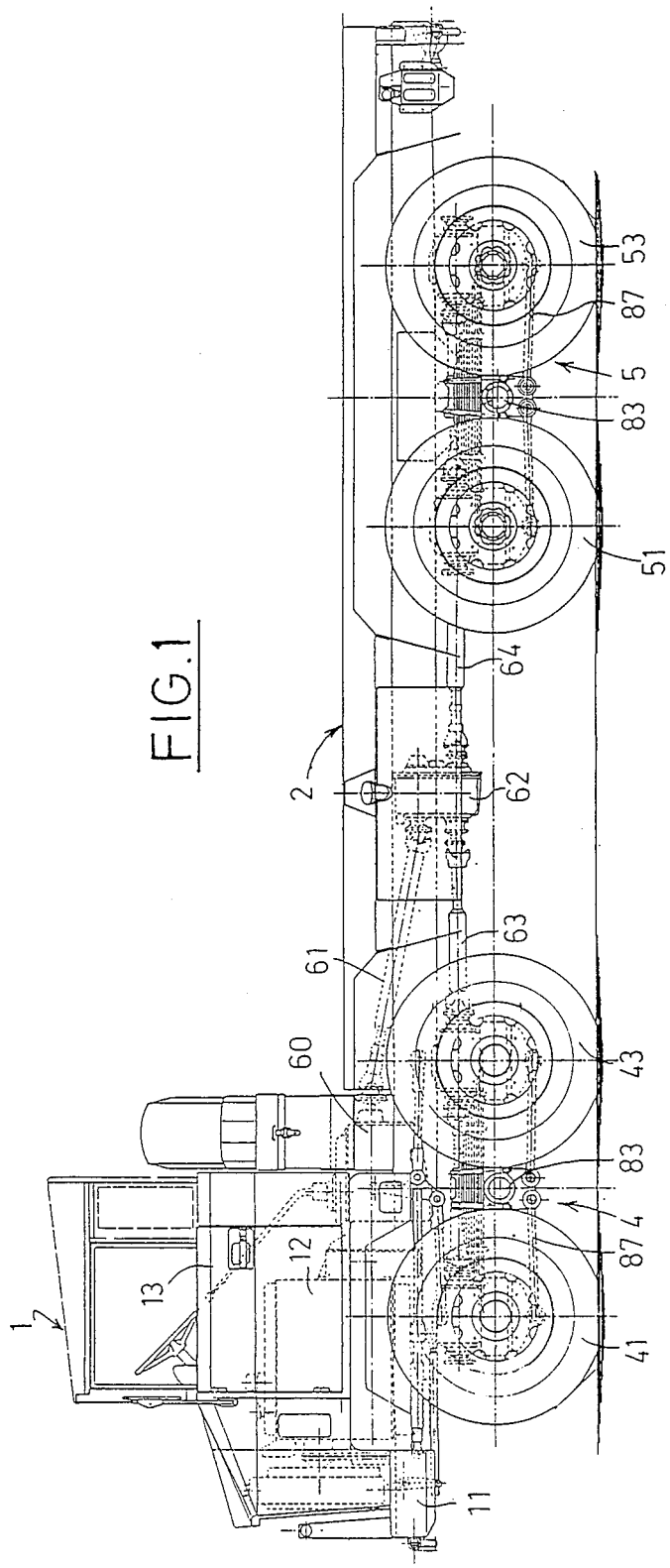
FIG. 1 is a side view of a vehicle in accordance with an embodiment of the invention.
Figure 2:
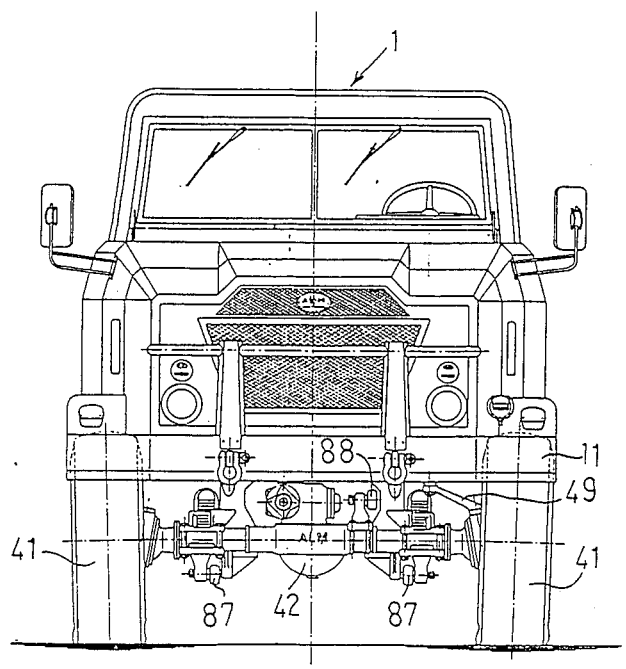
FIG. 2 is a front view of the vehicle.

The transmission of drive from the engine 12 (6 cylinders delivering 165 M.P. at 2900 r.p.m.) to the wheels is obtained through a clutch of size 14 and a gear-box 60 (5 forwards and 1 reverse gears) on the engine output shaft, connected by a propeller shaft 61 to a transfer box 62 with a differential to share torque between the front and rear axle sets and having two speeds (ratios 1 and ½) (FIG. 1). From the transfer box 62, two transmission shafts 63, 64 extend respectively to the rear axle 44 of the front set and to the front axle 52 of the rear set; two inter-axle transmission shafts 65, 66 extend respectively from the rear axle 44 of the front set to transmit drive to the frontmost axle 42, and from the front axle 52 of the rear set to transmit drive to the rearmost axle 54.

The axles of the front set and the rear set are similar, except that the axles 42, 44 of the front set comprise C.V. joints of the kind referred to as RZEPPA 6″ joints; the two axles of the same set are substantially identical; each of the four axles comprises a differential and has a double reduction ratio of 1/6.66.

Control of the steered wheels is assisted and obtained from a steering wheel and column, solid with a re-circulating ball steering box 70 (FIGS. 5A and 6) from which extend downwards a trailing steering arm 71, hinged on a horizontal axis to one end of a control rod 72 in two parts which are screwed together so that their length is adjustable and extending horizontally; the opposite end of the control rod is fixed to a hydraulic shuttle valve 73 controlling a hydraulic assistance ram 74, one end of whose body is secured in abutment against a fixed point, and the free end of whose shaft bears a rod 75 in two parts itself secured by means of a knuckle joint to a relay lever 76 of which one end is hinged on a fixed point and whose two other zones comprise respective hinges with a control rod 77 for the steering mechanism of the front axle and with a control rod 78 for the steering mechanism of the rear axle, of the front set; these two control rods 77, 78 are in three parts screwed together so as to be of adjustable length. The fixed point for the hydraulic ram 74 is disposed ahead of the front axle, slightly behind the steering box 70, while the fixed point of the relay lever 76 is in the transverse vertical plane of the vehicle which is disposed between the two axles 42, 44 of the front set 4 at equi-distance therefrom (that is to say at equi-distance from the pivot axes 46 ahead and behind the steered wheels); the two control rods 77, 78 respectively for the mechanisms of the front and rear axles 42 and 44 are hinged on the knuckle arm 49 of the corresponding mechanism at the vertical from the line joining the pivot axes of the wheels of the relevant axle.

The suitability of the vehicle for off-highway driving is also to a large extent due to the design of its suspension, which is substantially similar for the front and rear axle sets. This suspension is organized about the vertical transverse plane mentioned above, for the front set, and about the vertical transverse plane disposed between the two axles of the rear set at equidistance therefrom, for the rear set, which forms a plane of symmetry for the relevant axle, and the front and rear sets 4 and 5 are themselves generally symmetrical about a vertical transverse plane relative to the vehicle.

Figure 6:
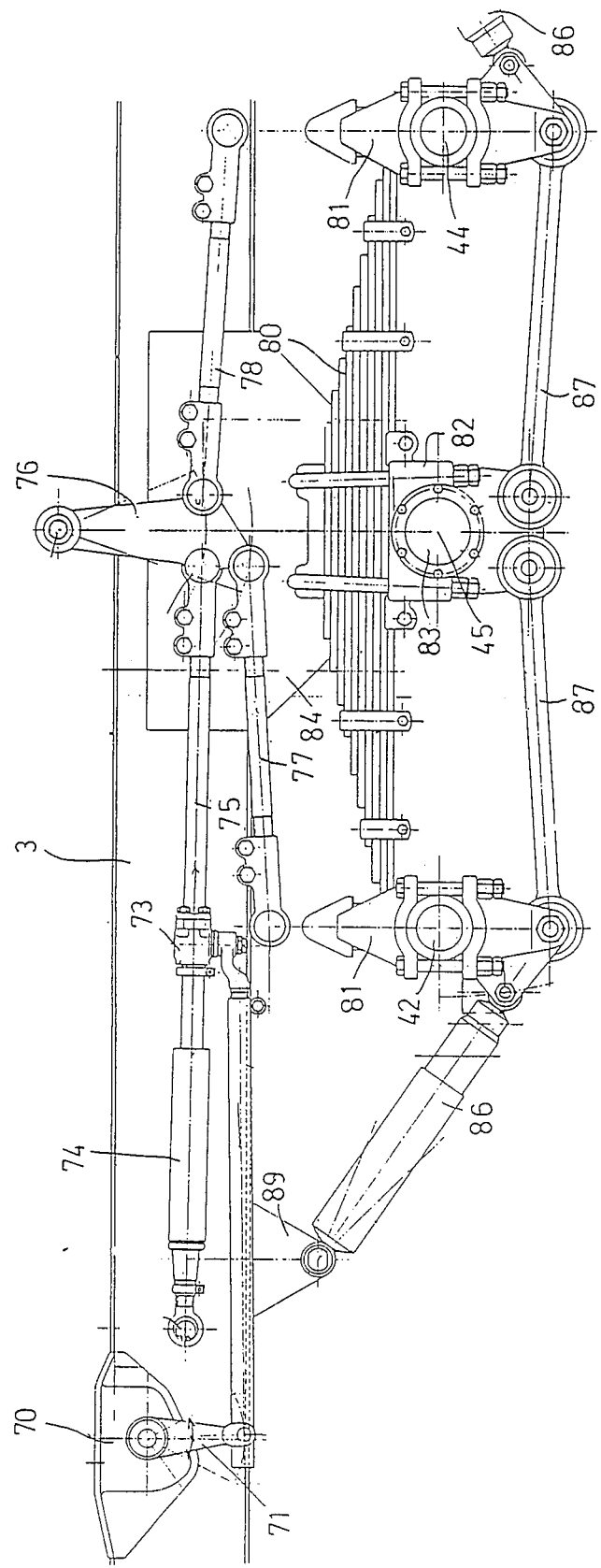
FIG. 6 is a side view of the steering mechanism and the main suspension members of the wheels of the front axle.
Figures 7, 8:
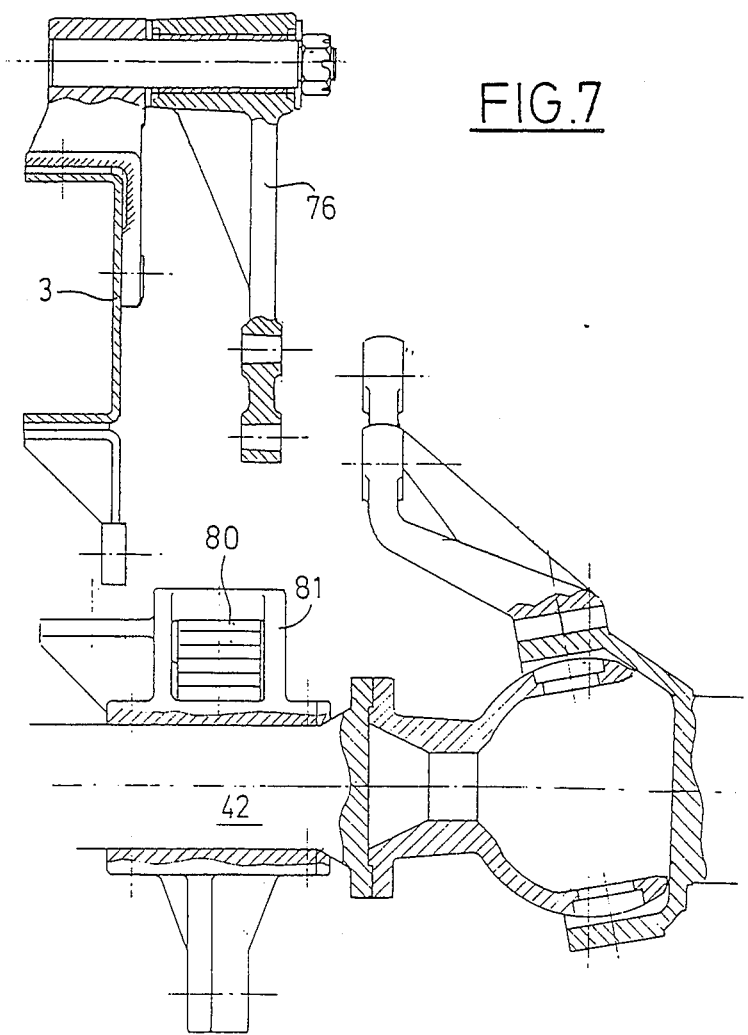
FIG. 7 is a front view, partly in section of some of the members shown in FIG. 6.
FIG. 8 is a front view, partly in section, of other members shown in FIG. 6.

Thus considering the front axle set, at each side (left and right), the suspension comprises a stack 80 of leaf springs extending longitudinally of the vehicle, as shown in FIGS. 6 and 8, the lengths of the upper springs being shorter than the lengths of the lower springs, the springs being disposed "inverted" and free to slide slightly one against the other; the lower spring of the stack is secured at each end to a respective seat 81 clamped to the front and rear axle 42 and 44, and the contact of the lowermost spring on the seat 81 is disposed above the point vertically above the longitudinal axis of the seat the springs themselves are clamped in their mid-region by means of hoops borne on the top of a clamp device 82 of a pivot 83 placed beneath the stack 80 and whose longitudinal axis 45 is horizontal and in the transverse plane of symmetry of the front axle set below the level of the axes of rotation of the wheels. This pivot 83 extends in one strech from the right-hand stack of springs 80 to the left-hand stack and is supported by bearings 84 fixed against the inner face of the chassis girders and extending downwards therefrom. A similar leaf spring suspension is provided for the rear axle set also.

This suspension is completed by a particular feature which comprises hydraulic telescopic shock absorbers 86 in the front axle set only and, in both the front and rear axle sets, reaction rods 87, 88. Thus, in the front axle set only and on each side, two hydraulic telescopic shock-absorbers forming suspension strubs and mointed on "silent blocks" extend in a plane which is longitudinal to the vehicle (the same plane for the front and rear axle sets) and are .mounted pivotingly and inclined between, at one end, the clamp device 81 of the front axle 42 or rear axle 44, and at the other end a support 89 fixed under the chassis in front of the corresponding clamp device 81 for the first shock absorber and a support fixed under the chassis at the rear of the other clamp device 81 for the second shock absorber; the fixing of the shock absorbers 86 to the clamp devices 81 is in the lower part of the clamps 81; each shock absorber 86 is associated with a reaction rod 87 also extending in a plane longitudinal to the vehicle (the same plane for all the reaction rods on one side); each reaction rod 87 is mounted pivotingly between the lower part of the clamp device of the axle to which the corresponding shock absorber is fixed and the lower part of the clamp 82 of the pivot 83 placed below the suspension spring stack 80 and consequently below the pivot 83; the reaction rods 87 are normally slightly inclined, their end fixed to the clamp 82 of the pivot being slightly above the opposite end. The rear axle set, as mentioned above, does not include shock absorbers 86, but include reaction rods 87 mounted in exactly the manner described above.

On the front axle set and also the rear set, two other reaction rods 88 (FIG. 3) are provided, making a total of four rods, but only on the left hand side, between the spring stack 80 and the vehicle's longitudinal axis. The rods 88 extend substantially parallel to the chassis girders 3, between the clamp device 82 of the pivot whose longitudinal axis 45, 55 extends in the transverse plane of symmetry of the relevant axle set 4, 5 and respectively a clamp device
 surrounding the front axle and a clamp device surrounding the rear axle; the reaction rods 88 extend above the level of the axes of rotation of the wheels.

Thus, the wheels of the given axle set not only have a certain freedom of movement in height between the left and right sieves but also can pivot about the axis extending horizontally in a vertical plane equi-distant between the axles of the relevant set.

I claim:
1. An automobile vehicle comprising:
a driving cab and a low-bearing platform,
a chassis on which said cab and platform are mounted, said chassis having first and second longitudinal girders disposed side by side, said girders being non-articulatable about any vertical axis,
front and rear axle sets on which said chassis is disposed and supported, each of said axle sets comprising respectively front and rear drive axles;
a transverse pivot axis secured to said chassis, and
suspension means connecting said front and rear axles with the corresponding pivot axis respectively, each of said axle sets comprising at least two driven wheels on opposite sides of the axle, each said front axle being substantially similar to the corresponding rear axle of the same set, and said front and rear wheels of said front axle set being connected to steering linkage means for being steerable and said front and rear axles of said front axle set comprising velocity joints but being otherwise substantially similar to said axles of said rear set and being spaced apart by a similar distance to the spacing of said axles of said rear set, each said pivot axis being disposed substantially equi-distant between said front and rear axles of the corresponding set, whereby said axles may pivot about the corresponding pivot axis.

2. A vehicle as claimed in claim 1 and comprising a transmission for transmitting drive to said wheels, said transmission including a transfer box, said transfer bow including a differential for distributing the drive between said front and rear axle sets.

3. A vehicle as claimed in claim 2, wherein said transmission includes a gear-box, a propeller shaft driven by said gear-box connected to said transfer box, and respectively propeller shafts driven by said transfer box connected to said front and rear axle sets.

4. A vehicle as claimed in claim 1, including a steering-box having a steering arm, wherein said steering linkage means comprises a substantially horizontal primary control rod connected at one end to said steering arm, a hydraulic valve connected to said control rods, a hydraulic ram for providing mechanical assistance controller by said valve, a relay lever hinged on a fixed point and connected to be moved by said control rod and said ram, said ram being connected to react against a fixed abutment and front and rear secondary control rods connected to control the steering angle of the wheels of said front and rear axles respectively in said front axle set.

5. A vehicle as claimed in claim 4, wherein said fixed point of said relay lever is disposed substantially in a vertical plane transverse to the vehicle and disposed equi-distant between the front and rear axles of said front axle set.

6. A vehicle as claimed in claim 4, wherein said steering linkeage means includes knuckle arms connected to said secondary control rods, said knuckle arms being secured to respective hubs for the respective wheels of the front axle set, the hinged connections between said knuckle arms and said control rods being disposed substantially vertically above the line joining the pivot axes of the wheels of the same axle.

7. A vehicle as claimed in claim 1, wherein the respective vertical projections onto a horizontal plane of the extensions of the central axes of rotation of each steered wheel intersect in the same point situated on the vertical projection onto the horizontal plane of the extension of said pivot axis of said rear axle set, disposed equi-distant between the front and rear axles of said rear axle set.

8. A vehicle as claimed in claim 1, wherein said suspension means for each axle set comprises on each side a respective stack of springs clamp means clamping a central portion of said stack to a pivot disposed below said stack and whose longitudinal axis is horizontal and in the transverse plane of symmetry of the relevant axle set, said longitudinal axis of said pivot forming said pivot axis of the axle set disposed equi-distant between said front and rear axles.

9. A vehicle as claimed in claim 1, wherein said suspension means for said front axle set comprises on each side and for each axle a respective hydraulic telescopic shock absorber means and, for both said front and rear axle sets, comprises on each side and for each axle a respective reaction rod, said shock absorber means being mounted pivotingly and inclined between a support fixed to said chassis and clamp means on the corresponding axle, and said reaction rod being mounted pivotingly between clamp means on the axle and clamp means on a pivot defining said pivot axis of the relevant axle set and disposed equi-distant between the front and rear axles.

10. A vehicle as claimed in claim 1, 8, wherein said suspension means includes, for each axle set, two reaction rods disposed substantially parallel to said chassis girders and mounted pivotingly between clamp means of a pivot defining said pivot axis of the axle set and respective clamp means on said front axle and on said rear axle.

* * * * *